United States Patent
Pan et al.

(10) Patent No.: US 9,508,372 B1
(45) Date of Patent: Nov. 29, 2016

(54) SHINGLE MAGNETIC WRITER HAVING A LOW SIDEWALL ANGLE POLE

(71) Applicant: Western Digital (Fremont), LLC, Fremont, CA (US)

(72) Inventors: Yu Pan, Fremont, CA (US); Lieping Zhong, San Jose, CA (US); Yugang Wang, Milpitas, CA (US); Zhigang Bai, Fremont, CA (US); Tao Pan, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 1 day.

(21) Appl. No.: 14/729,403

(22) Filed: Jun. 3, 2015

(51) Int. Cl.
*G11B 5/127* (2006.01)
*G11B 5/60* (2006.01)
*G11B 5/31* (2006.01)
*G11B 5/147* (2006.01)

(52) U.S. Cl.
CPC .......... *G11B 5/6082* (2013.01); *G11B 5/1272* (2013.01); *G11B 5/1278* (2013.01); *G11B 5/147* (2013.01); *G11B 5/3116* (2013.01)

(58) Field of Classification Search
CPC ..... G11B 5/127; G11B 5/1278; G11B 5/187; G11B 5/1871; G11B 5/3109; G11B 5/3116; G11B 5/147
USPC .............. 360/125.03, 125.06, 125.09, 125.1, 360/125.12, 125.13, 125.14
See application file for complete search history.

(56) References Cited

U.S. PATENT DOCUMENTS

| 6,016,290 A | 1/2000 | Chen et al. |
|---|---|---|
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |

(Continued)

*Primary Examiner* — Jefferson Evans
(74) *Attorney, Agent, or Firm* — Convergent Law Group LLP

(57) ABSTRACT

A method and system provide a shingle magnetic write transducer. The transducer has an air-bearing surface (ABS) and includes a main pole and at least one coil. The coil(s) are configured to energize the main pole. The main pole includes a leading surface, a trailing surface, and a plurality of sides between the leading surface and the trailing surface. At least one of the plurality of sides form a sidewall angle with a down track direction. The sidewall angle is less than thirteen degrees and is at least zero degrees. In some aspects, the sidewall angle is less than a maximum skew angle for the data storage system.

12 Claims, 8 Drawing Sheets

(56) References Cited

U.S. PATENT DOCUMENTS

| | | |
|---|---|---|
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |

(56) References Cited

U.S. PATENT DOCUMENTS

| | | |
|---|---|---|
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |

(56) References Cited

U.S. PATENT DOCUMENTS

| | | |
|---|---|---|
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |

(56) References Cited

U.S. PATENT DOCUMENTS

| | | |
|---|---|---|
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,139 B2 | 6/2013 | Urakami et al. |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 * | 8/2013 | Liu et al. ............... 360/125.13 |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 * | 12/2013 | Liu et al. ............... 360/324.1 |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,767,344 B2 | 7/2014 | Ishibashi et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,988,825 B1 * | 3/2015 | Zhang et al. ............... 360/125.3 |
| 2001/0017751 A1 * | 8/2001 | Miyazaki ............... B82Y 10/00 360/317 |
| 2007/0230044 A1 * | 10/2007 | Han ............... G11B 5/1278 360/125.04 |
| 2008/0316644 A1 * | 12/2008 | Lee et al. ............... 360/110 |
| 2010/0097720 A1 * | 4/2010 | Ihara ............... B82Y 10/00 360/122 |
| 2010/0290157 A1 | 11/2010 | Zhang et al. |
| 2011/0051293 A1 * | 3/2011 | Bai et al. ............... 360/313 |
| 2011/0086240 A1 | 4/2011 | Xiang et al. |
| 2012/0111826 A1 | 5/2012 | Chen et al. |
| 2012/0162808 A1 * | 6/2012 | Masuda et al. ............... 360/59 |
| 2012/0162811 A1 | 6/2012 | Ishibashi et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0314324 A1 * | 12/2012 | Guan ............... 360/123.12 |
| 2013/0057981 A1 | 3/2013 | Urakami et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0279039 A1 | 10/2013 | Shiroishi |
| 2014/0153134 A1 * | 6/2014 | Han ............... G11B 5/012 360/234.3 |
| 2014/0154529 A1 | 6/2014 | Yang et al. |
| 2014/0175050 A1 | 6/2014 | Zhang et al. |
| 2014/0177091 A1 | 6/2014 | Urakami et al. |
| 2015/0002959 A1 * | 1/2015 | Basu ............... G11B 5/11 360/125.03 |
| 2015/0103445 A1 * | 4/2015 | Xue ............... G11B 5/1278 360/236.4 |

* cited by examiner

SHINGLE MAGNETIC WRITER HAVING A LOW SIDEWALL ANGLE POLE

BACKGROUND

FIG. 1 is an air-bearing surface (ABS) view of a conventional magnetic recording transducer 10 for shingle magnetic recording. In shingle magnetic recording blocks of data are written such that the tracks in a block overlap in one direction. Thus, the bits in one track for the block are written, then the bits for the next track, and so on. Each track in the block except the first track written overlaps a previously written adjoining track along the radial direction. Similarly, each track except the last track is overlapped by a next adjacent track in the block. Thus, the tracks are aligned in a manner analogous to shingles on a roof.

The conventional shingle magnetic recording transducer 10 has an underlayer 12 that may include a leading shield, side gap 14, side shields 16, top gap 17, a top (or trailing) shield 18 and a main pole 20. The main pole 20 resides on an underlayer/leading shield 12. The side shields 16 are separated from the main pole 20 by a side gap 14. The gap 14 between the side shields 16 and the main pole 20 may have a substantially constant thickness.

The main pole 20 includes sidewalls that form a nonzero angle, $\gamma$, with the down track direction at the ABS. The sidewall angle, $\gamma$, is set based on the skew angle the down track direction of the transducer 10 makes with the media (not shown in FIG. 1). At skew, the down track direction makes an angle with the media down track direction depending upon where in the disk recording is being performed. At a zero skew angle, the down track direction of the head matches the media down track direction. Generally, the skew angle is symmetric around this zero skew angle and reaches a maximum skew angle, $\beta_{max}$. Stated differently, the skew angle generally ranges from $-\beta_{max}$ to $\beta_{max}$. For shingle magnetic recording, the sidewall angle is set to be equal to the maximum skew angle ($\gamma = \beta_{max}$). Typically, this means that the sidewall angle is at least thirteen degrees.

Although the conventional magnetic recording head 10 functions, the conventional magnetic recording head 10 is desired to be used at higher areal densities. Accordingly, what is needed is a system and method for improving the performance of a magnetic recording head at higher areal densities and, therefore, lower track widths.

BRIEF DESCRIPTION OF SEVERAL VIEWS OF THE DRAWINGS

FIGS. 7-10A and 10B depict various views of an exemplary embodiment of a single magnetic recording transducer during fabrication.

DETAILED DESCRIPTION OF THE PREFERRED EMBODIMENTS

Figure 1:
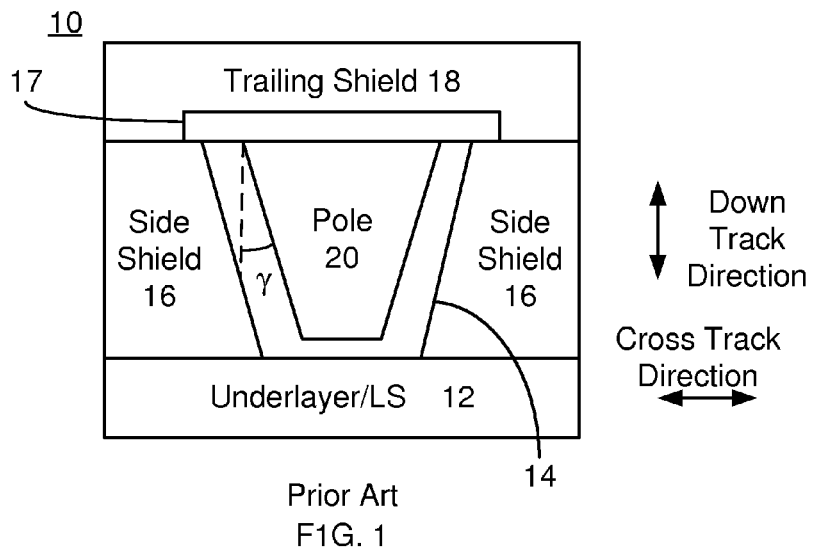
FIG. 1 depicts view of a conventional shingle magnetic recording head.
Figure 2A:
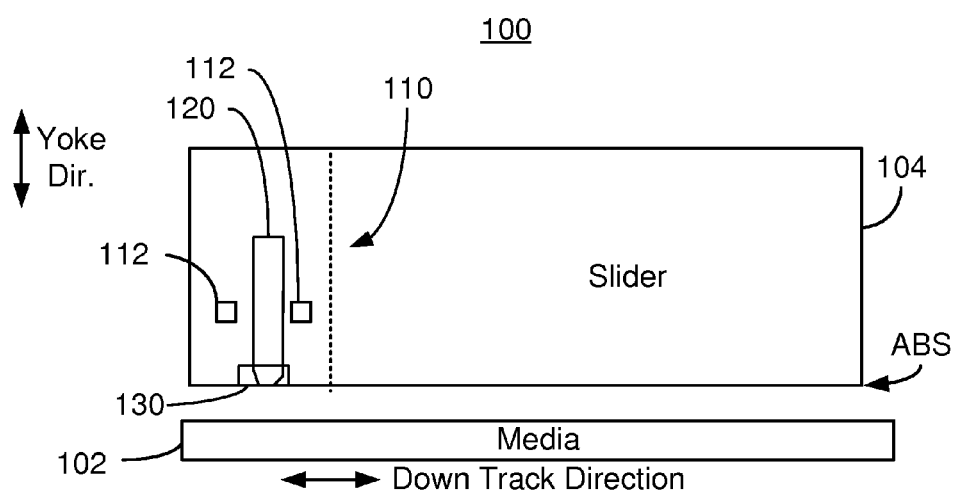
FIGS. 2A and 2B depict a side view and an ABS view of an exemplary embodiment of a shingle magnetic recording disk drive.
Figure 2B:
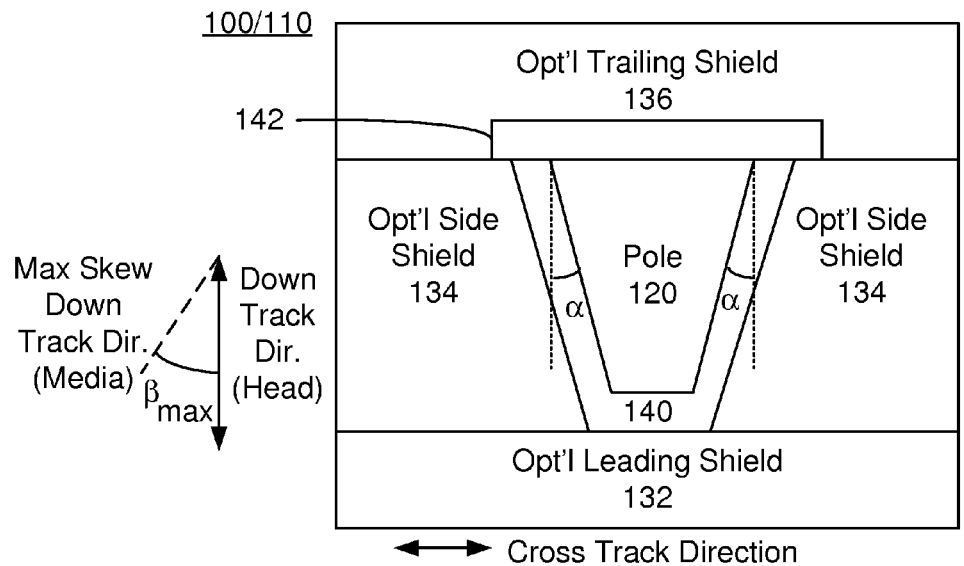

FIGS. 2A and 2B depict a side view and an air-bearing surface (ABS) view of an exemplary embodiment of a shingle magnetic recording write apparatus, or disk drive, 100. For clarity, FIGS. 2A-2B are not to scale. The disk drive 100 includes a slider 104 having a shingle magnetic write transducer 110. For simplicity not all portions of the disk drive 100 and transducer 110 are shown. In addition, although the disk drive 100 and transducer 110 are depicted in the context of particular components other and/or different components may be used. For example, circuitry used to drive and control various portions of the disk drive is not shown. For simplicity, only single components are shown. However, multiples of each components and/or their subcomponents, might be used. The disk drive may be a perpendicular magnetic recording (PMR) disk drive. However, in other embodiments, the disk drive may be configured for other types of magnetic recording included but not limited to heat assisted magnetic recording (HAMR).

The disk drive 100 includes a media 102 and a slider 104 on which the transducer 110 has been fabricated. Although not shown, the slider 104 and thus the transducer 110 are generally attached to a suspension. In general, the slider 104 includes the write transducer 110 and a read transducer (not shown). However, for clarity, only the write transducer 110 is shown.

The transducer 110 includes a main pole 120, shield(s) 130, a side gap 140 (which also resides below the main pole 120 in the embodiment shown), write gap 142 and coil(s) 112. The shield(s) 130 include an optional leading shield 132, optional side shields 134 and an optional trailing shield 136 (collectively termed shields 130). The coil(s) 112 are used to energize the main pole 120. One turn is depicted in FIG. 2A. Another number of turns may, however, be used. Note that only a portion of the coil(s) 112 may be shown in FIG. 2A. If, for example, the coil(s) 112 is a spiral, or pancake, coil, then additional portions of the coil(s) 112 may be located further from the ABS. Further, additional coils and/or additional layers of coils may also be used.

The main pole 120 has a top (trailing surface) wider than the bottom (leading surface). The main pole 114 thus includes sidewalls having sidewall angles that are greater than or equal to zero. The main pole 120 is depicted as having a trapezoidal shape. In other embodiments, the main pole 120 may have a triangular shape. Thus, the bottom may be an edge instead of a surface. In some embodiments, the main pole 120 may have leading (bottom) bevel and/or a trailing (top) bevel. Thus, the main pole 120 may be shorter in the down track direction at the ABS than at location(s) recessed from the ABS. In some embodiments, the leading bevel may be a real leading bevel. Such a leading bevel is formed by configuring the top surface of the leading shield 132 (or other part of the underlayer) and thus the gap 140 to slope at a nonzero angle from a direction perpendicular to the ABS. The real leading bevel of the main pole 120, when present, generally follows the contours of this surface. Note that a real leading bevel is in contrast to a "natural" leading bevel that may be formed because the trench in which the main pole 120 is formed is narrower near the ABS and thus fills more rapidly with the material for the gap 140 than portions of the trench further form the ABS.

The gap layer 140 may include one or more sublayers as well as a seed layer. Further, although depicted as a single gap 140 below and along the sides of the main pole 120 is shown, the gap 140 may include separate side gaps (between the mail pole 120 and side shields 134) and bottom gap (between the main pole 120 and leading shield 132). In addition, the write gap 142 and side gap 140 may be a single structure. However, in such embodiments, the write gap 142 generally does not extend further in the cross track direction than the side gap 140. Although depicted as symmetric, the gap 140 may be asymmetric. For example, the gap 142 between a side of the main pole 120 and one side shield 134 may be wider than the gap 142 between the opposite side of the main pole 120 and the other side shield 134.

As discussed above, the main pole 120 has a top wider than the bottom. Thus, the sidewalls of the main pole 120 form a sidewall angle, a, with the down track direction. The sidewalls may be symmetric, forming the same sidewall angle with the down track direction. In other cases, the sidewall angles differ. In some embodiments, the sidewall angle is at least zero degrees and less than thirteen degrees. In some embodiments, the sidewall angle is less than ten degrees. In some embodiments, the sidewall angle is at least three degrees and not greater than eight degrees. For example, the sidewall angle is at least five degrees and not greater than seven degrees. In some cases, the sidewall angle is nominally six degrees.

Figure 3A:
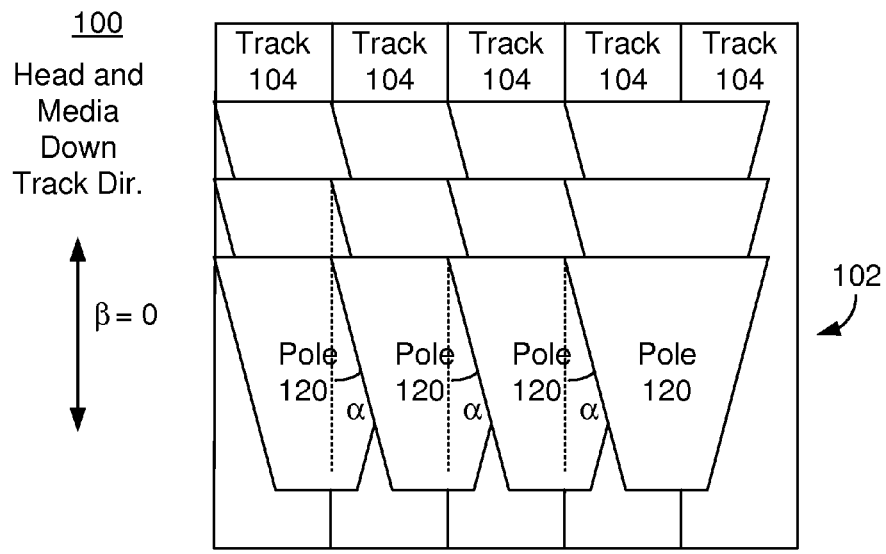
FIGS. 3A-3C are views of an exemplary embodiment of a portion of the disk drive at various skew angles.
Figure 3B:
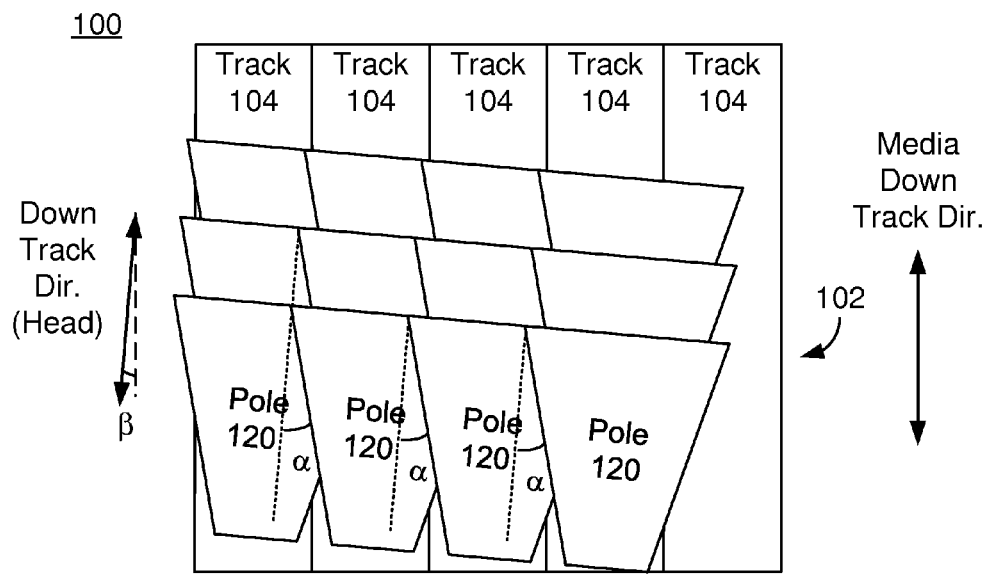
Figure 3C:
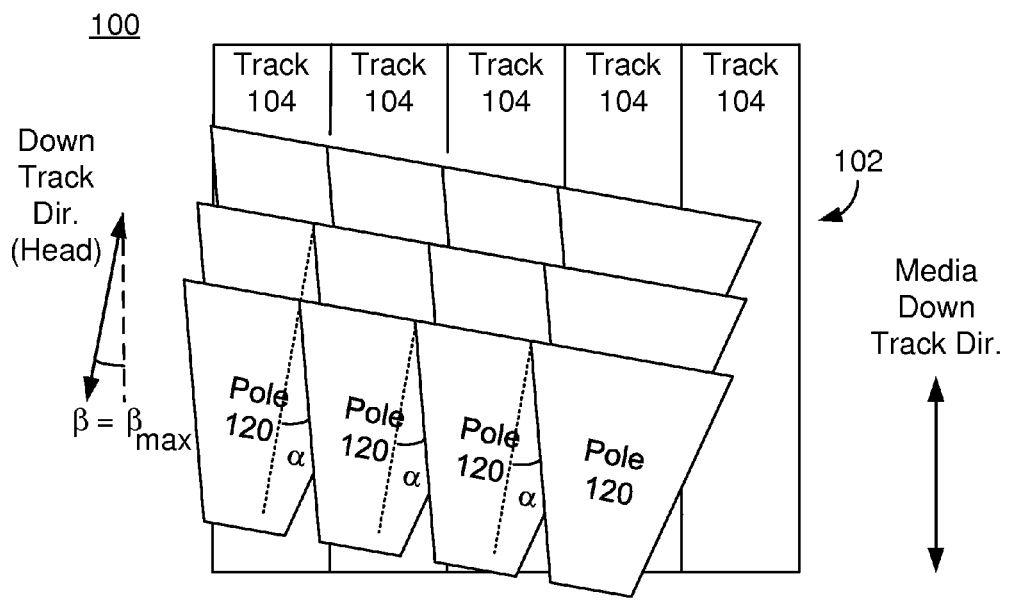

In shingle magnetic recording, the down track direction of the main pole 120 and transducer 110 may be at a skew angle, $\beta$, from the media down track direction. During recording for at least part of media 102. The skew angle varies up to a maximum skew angle, $\beta_{max}$. In some embodiments, the skew angle is symmetric around a zero skew angle (media down track direction parallel to the down track direction of the head). For example, FIGS. 3A-3C depict views of an exemplary embodiment of a portion of the disk drive 100 at various skew angles. In FIG. 3A, the disk drive is shown when the transducer 110 is oriented at a zero skew angle ($\beta$=0). Thus, the down track direction for the transducer is aligned with the down track direction of the media. Tracks 104 are also shown. The position of the main pole 120 while recording bits for each track 120 is also shown. FIG. 3B depicts the disk drive 100 when the transducer is oriented at an intermediate skew angle. In FIG. 3C, the transducer 110 is oriented at the largest skew angle, ($\beta$=$\beta_{max}$). This may occur at the inside diameter or outside diameter of the disk 102. In general, if the situation shown in FIG. 3C is at the outside diameter, then at the inside diameter, $\beta$=-$\beta_{max}$. Thus, the skew angle may vary between -$\beta_{max}$ and $\beta_{max}$. In other embodiments, the skew angle may not be symmetric around a zero skew angle.

The sidewall angle of the main pole 120 may also be set based on the skew angle. More specifically, the sidewall angle of the main pole 120 may be less than the maximum skew angle ($\alpha$<$\beta_{max}$). For example, if the maximum skew angle is thirteen degrees, then the sidewall angle is less than thirteen degrees. The sidewall angle may be in the ranges described above, including nominally six degrees. For different maximum skew angles, the sidewall angle may differ.

Performance of the transducer 110 and disk drive 100 may be improved by shaping of the main pole 120. Use of a smaller sidewall angle may allow for a higher write field without adversely affecting track width. For example, the smaller sidewall angles may allow for more magnetic material to be contained in the tip of the main pole 120 without requiring a wider track width. The top (trailing) surface off the main pole 120 may have the same width in the cross track direction but provide a higher write field. The profile of the magnetic field for the main pole may also be improved. For example, the field may be stronger at the track edge, which is advantageous for shingled magnetic recording performance. These features may be enhanced by using a leading bevel for the main pole. Shingled magnetic recording may thus be extended to smaller track widths. For example, shingled magnetic recording may be performed at track widths of sixty nanometers or less. Consequently, performance of the shingled magnetic writer 100 may be improved.

Figure 4:
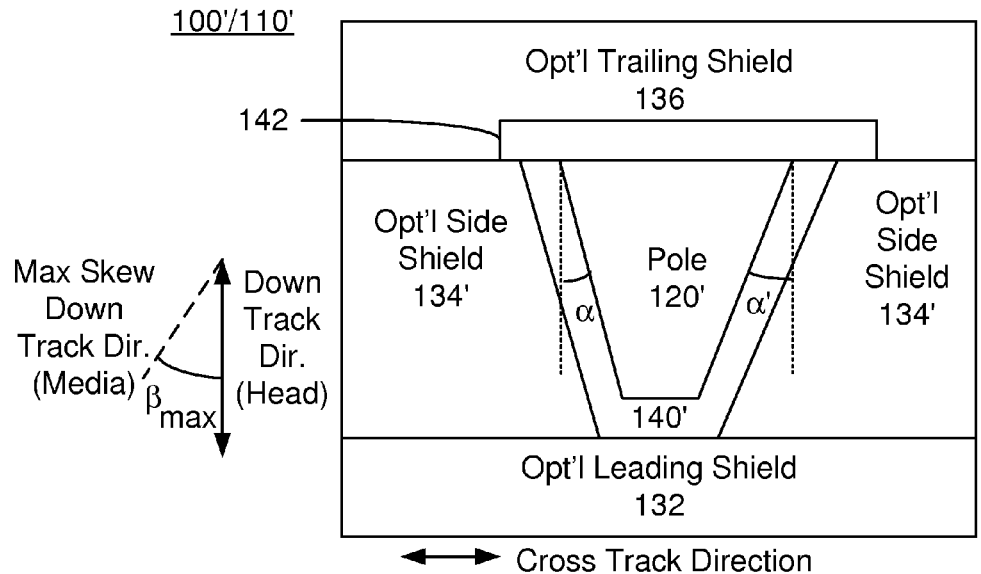
FIG. 4 is an ABS view of another exemplary embodiment of a portion of a shingle magnetic recording transducer.

FIG. 4 is an ABS view of another exemplary embodiment of a portion of a disk drive 100' used in shingled magnetic recording. For clarity, FIG. 4 is not to scale. The disk drive 100' and transducer 110' are analogous to the disk drive 100 and transducer 110, respectively. Consequently, analogous components have similar labels. The shingled magnetic recording transducer 110' includes an optional leading shield 132, optional side shields 134', optional trailing shield 136, gap 140', write gap 142 and main pole 120' that are analogous to the optional leading shield 132, optional side shields 134, optional trailing shield 136, gap 140, write gap 142 and main pole 120, respectively.

As can be seen in FIG. 4, the main pole 120' is asymmetric. Consequently, the gap 140' and side shields 134' are also asymmetric. The sidewall angle is $\alpha$ on one side of the main pole 120' and $\alpha$' on the other side of the main pole 120'. In some embodiments, both the sidewall angles $\alpha$ and $\alpha$' may still desired to be less than the maximum skew angle. In addition, both the sidewall angles $\alpha$ and $\alpha$' may still be in the ranges described above. Thus, $\alpha$ and $\alpha$' may be less than thirteen degrees and at least zero degrees. In some embodiments, the sidewall angles are each less than ten degrees. In some embodiments, the sidewall angles are at least three degrees and not greater than eight degrees. For example, the sidewall angles may each be at least five degrees and not greater than seven degrees. In alternate embodiments, only one sidewall angle may be less than the maximum skew angle and/or in the ranges described above.

The shingled magnetic writer 110' may share the benefits of the shingled magnetic writer 110. Use of a smaller sidewall angle may allow for a higher write field without adversely affecting track width. The profile of the field for the main pole may also be improved. These benefits may be enhanced by using a leading bevel for the main pole 120'. Consequently, performance of the shingled magnetic writer 100' may be improved.

Figure 5:
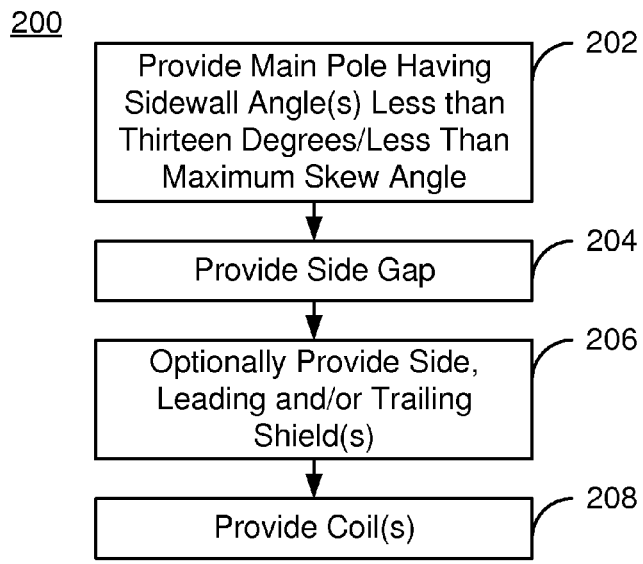
FIG. 5 depicts a flow chart of an exemplary embodiment of a method for providing a shingle magnetic recording transducer.

FIG. 5 depicts an exemplary embodiment of a method 200 for providing a shingled magnetic recording transducer or analogous data storage device. For simplicity, some steps may be omitted, interleaved, performed in another order and/or combined. The method 200 may be used to fabricate multiple magnetic recording heads at substantially the same time. The method 200 is described in the context of the shingled magnetic transducer 110. The method 200 may be used to fabricate other shingled magnetic recording transducer including but not limited to the transducer 110'. The method 200 is also described in the context of particular layers. A particular layer may include multiple materials and/or multiple sub-layers. The method 200 also may start after formation of other portions of the magnetic recording transducer.

The main pole 120 having the desired sidewall angle(s) is formed, via step 202. In some embodiments, step 202 includes forming a trench in one or more nonmagnetic layers. For example, one or more reactive ion etches (RIEs) may form the trench. The trench has a shape and location that corresponds to the pole. In other embodiments the trench may be provided in the side shields. Magnetic material(s) for the pole are deposited. The transducer may then be planarized. A trailing edge bevel may optionally be formed on the trailing surface (top) of the main pole. A leading edge bevel may be formed naturally or be a real leading edge bevel.

The side gap 140 is provided, via step 204. Step 204 may include depositing a Ru layer, for example via chemical vapor deposition, sputtering or another method. Additional layer(s) may also be provided. In some embodiments, step 204 is performed before step 202. Thus, the main pole 120 is provided on the side gap 140 in such embodiments.

The side shields 134 may optionally be provided, via step 206. The coil(s) 112 for the main pole are provided, via step 208. Step 208 may be interleaved with other steps of the method 200. For example, portions of the coil(s) 112 may be formed before the main pole 114 and side shields 134. The coil(s) formed may be helical coil(s) or spiral coils.

Using the method 200, a shingled magnetic transducer 110 having improved performance may be fabricated. Thus, the benefits of the transducer 110 and/or 110' may be achieved.

Figure 6:
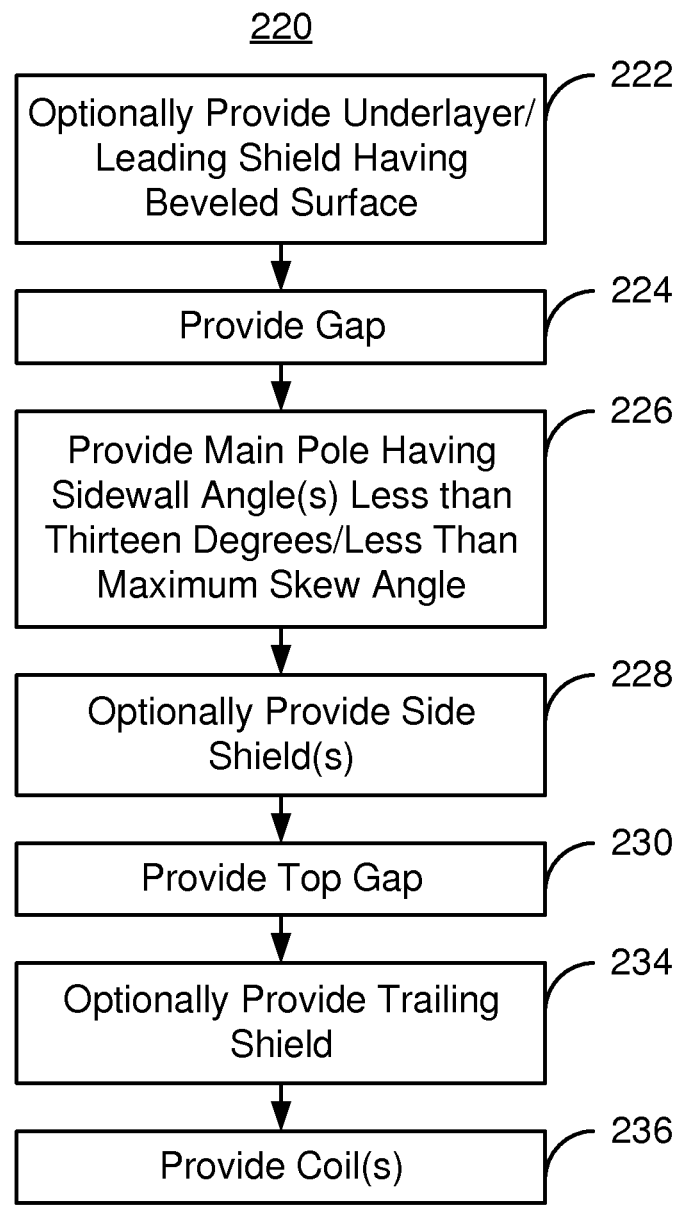
FIG. 6 depicts a flow chart of another exemplary embodiment of a method for providing a shingle magnetic recording transducer.

FIG. 6 depicts an exemplary embodiment of a method 220 for providing a shingled magnetic recording transducer having reduced sidewall angles. For simplicity, some steps may be omitted, interleaved, performed in another order and/or combined. FIGS. 7-10A and 10B depict an exemplary embodiment of a shingled magnetic write transducer 300 formed using the method 220. For clarity, FIGS. 7-10A and 10B are not to scale. The method 220 may be used to fabricate multiple magnetic recording heads at substantially the same time. The method 220 may also be used to fabricate other magnetic recording transducers. The method 220 is also described in the context of particular layers. A particular layer may include multiple materials and/or multiple sublayers. The method 220 also may start after formation of other portions of the magnetic recording transducer. For example, the method 220 may start after a read transducer has been fabricated.

A leading shield or other underlayer having a beveled surface is optionally provided, via step 222. A beveled surface extends from the ABS at an angle that is less than ninety degrees.

Figure 7:
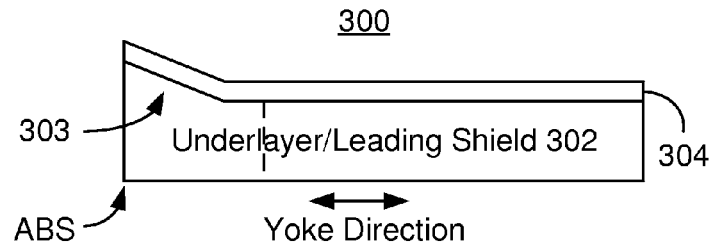

A side gap is provided, via step 224. Step 224 may include depositing an intermediate layer on the leading shield/underlayer, forming a trench in the desired location of the pole and having the desired profile for the main pole, then depositing the side gap material(s) in at least trench. In some embodiments, the side gap include multiple sublayers. FIG. 7 depicts a side view of the shingled magnetic recording transducer 300 after step 224 is performed. Thus, an underlayer/leading shield 302 is shown. The leading shield may not extend as far back from the ABS in the stripe height direction. Thus, the dashed line indicates the back edge of an embodiment of the leading shield. As can be seen in FIG. 7, the underlayer/leading shield 302 has a beveled surface 303. The beveled surface 303 is at a nonzero, acute angle with respect to both the ABS and the yoke direction. In the embodiment shown, the gap 304 has also been deposited and is conformal to the underlayer. In another embodiment, the gap may be nonconformal.

Figure 8A:
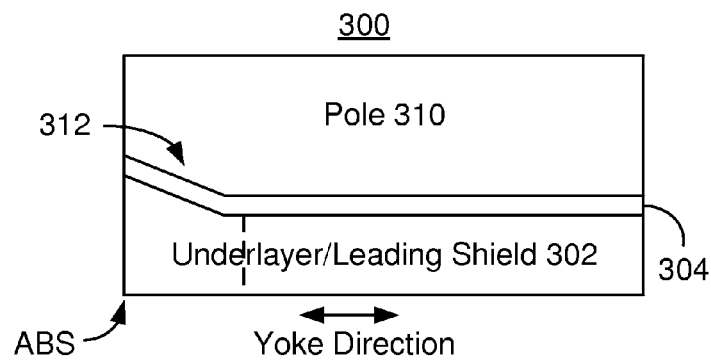
Figure 8B:
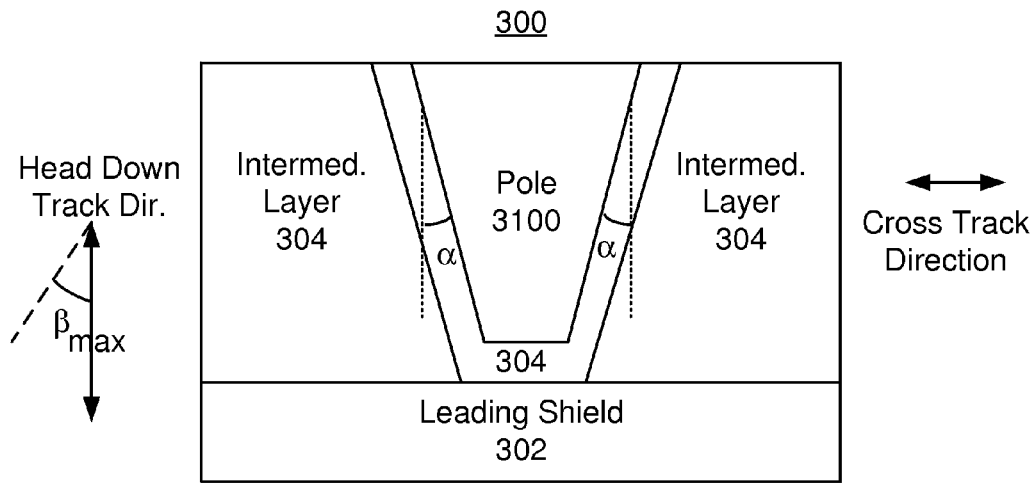
Figure 9A:
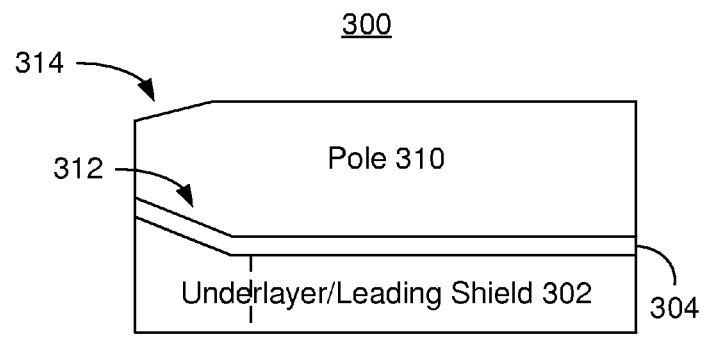
Figure 9B:
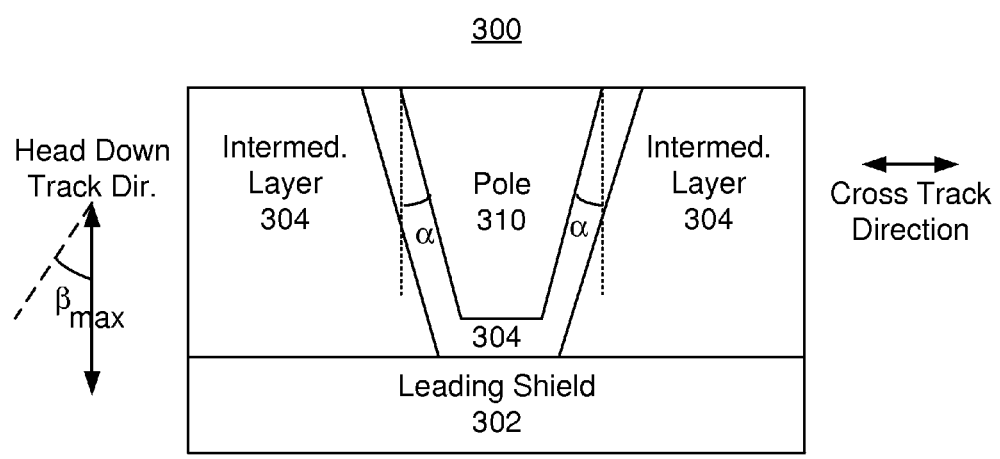

The main pole is provided, via step 226. Step 226 includes depositing a high moment magnetic material, for example via plating. The magnetic material(s) for the pole may also planarization performed in step 226. Leading and/or trailing bevels in the main pole may also be provided as part of step 226. FIGS. 8A and 8B depict side and ABS views of the shingled magnetic write transducer 300 after the magnetic material is plated and a planarization performed. Thus, the pole 310 is formed. The pole 310 has sidewall angles α and is symmetric. In other embodiments, the pole 310 may have different sidewall angles. The pole 310 also has a real leading bevel 312 corresponding to the sloped surface 303 of the underlayer/leading shield 302. Also shown is intermediate layer 305 in which the trench for the main pole was formed. FIGS. 9A and 9B depict side and ABS views, respectively, of the transducer 300 after step 226 is performed and in which a trailing bevel is used. As can be seen in FIG. 9A, the main pole 310 has a leading bevel 312 corresponding to the bevel in the underlayer/leading shield 302. The main pole 310 also has a trailing bevel 314. Thus, the height of the main pole 310 at the ABS has been reduced.

The side shields are provided, via step 228. Step 228 may include removing portions of the intermediate layer 305, depositing seed layer(s) and plating the soft magnetic and/or other material(s) for the side shields. Step 228 may be performed before steps 224 and 226 in some embodiments. In other embodiments, step 228 may be performed after steps 224 and 226. Alternatively, portions of the steps 224, 226 and 228 may be interleaved.

Figure 10A:
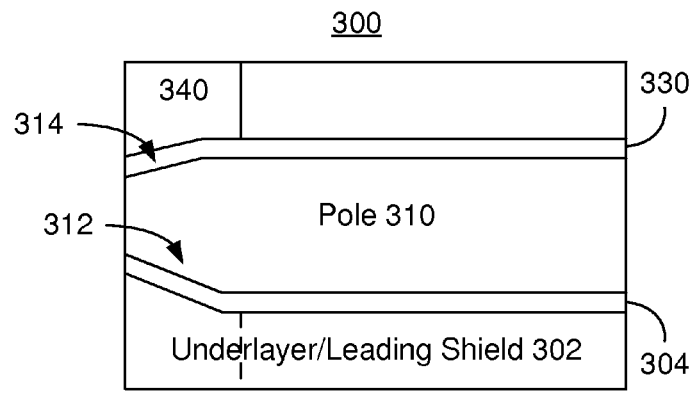
Figure 10B:
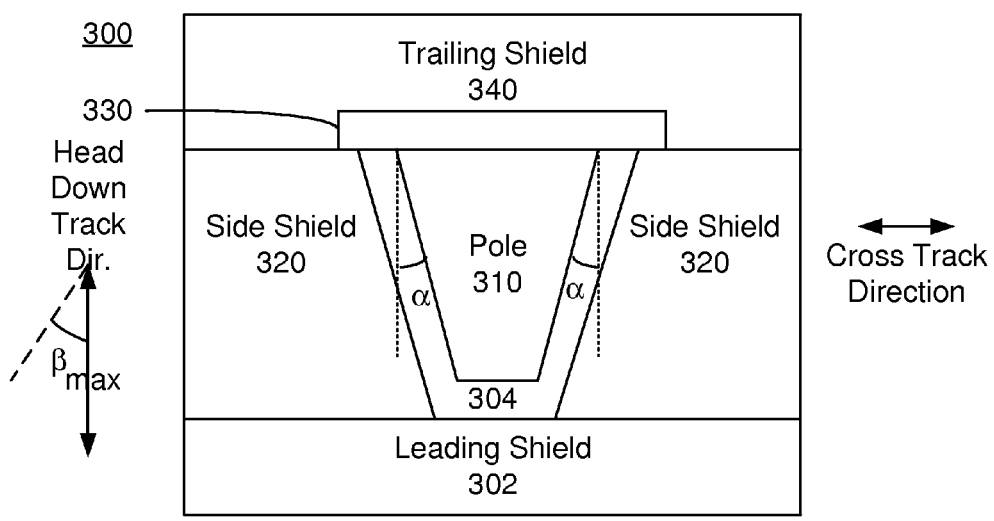

A top, or write gap layer may also be provided, via step 230. The trailing shield may optionally be formed, via step 232. Step 232 may include depositing a high moment, soft material. As seed layer might also be deposited in step 232. The coils are provided, via step 234. Portions of step 234 may be interleaved with portions of other steps in the method 220. FIGS. 10A and 10B depict side and ABS views of the transducer 300 after step 234 is performed. Thus, the write gap 330 and trailing shield 340 are shown.

Using the method 220, a shingle magnetic transducer having improved performance may be fabricated. Because of the shape of the main pole 310, the field magnitude and shape may be improved. Thus, a transducer having improved performance for shingled writing may be fabricated.

We claim:

1. A data storage device comprising:
a medium having a down track direction;
a slider including a shingle magnetic recording transducer having an air-bearing surface (ABS), a main pole and at least one coil configured to energize the main pole, the main pole having a leading surface, a trailing surface, and a plurality of sides between the leading surface and the trailing surface, at least one of the plurality of sides forming a sidewall angle with a down track direction, the sidewall angle being less than thirteen degrees and greater than zero degrees, the main pole being oriented at a plurality of skew angles with respect to the media track direction, the plurality of skew angles including a maximum skew angle, the sidewall angle being less than the maximum skew angle.

2. The data storage device of claim 1 wherein the sidewall angle is at least three degrees and not greater than eight degrees.

3. The data storage device of claim 2 wherein the sidewall angle is at least five degrees and not greater than seven degrees.

4. The data storage device of claim 1 wherein the at least one sidewall includes a first sidewall, the plurality of sidewalls including a second sidewall, the second sidewall forming an additional sidewall angle with the down track direction, the additional sidewall angle being different from the sidewall angle.

5. The data storage device of claim 1 wherein a portion of the leading surface includes a leading bevel at a leading bevel angle from the ABS, the leading bevel angle being less than ninety degrees.

6. The data storage device of claim 1 wherein the slider is oriented with respect to the media such that the main pole is not more than a maximum skew angle from the down track direction.

7. The data storage device of claim 1 wherein the plurality of sidewalls are substantially straight such that the at least one of the plurality of sidewalls forms only the sidewall angle with the down track direction.

8. A method for providing a shingle magnetic recording transducer having air-bearing surface (ABS) and oriented to write to a media having a media track direction, the method comprising:
    providing a main pole having a leading surface, a trailing surface, and a plurality of sides between the leading surface and the trailing surface, at least one of the plurality of sides forming a sidewall angle with a down track direction, the sidewall angle being less than thirteen degrees and greater than zero degrees, a portion of the main pole residing at the ABS, the main pole being oriented at a plurality of skew angles with respect to the media track direction, the plurality of skew angles including a maximum skew angle, the sidewall angle being less than the maximum skew angle; and
    providing at least one coil for energizing the main pole.

9. The method of claim 8 wherein the step of providing the main pole further includes configuring the sidewall angle to be at least three degrees and not greater than eight degrees.

10. The method of claim 9 wherein the sidewall angle is at least five degrees and not greater than seven degrees.

11. The method of claim 8 wherein the main pole is provided on at least one underlayer, the method further including:
    providing a top surface of the underlayer having an underlayer angle with the ABS, the main pole being formed on the top surface such that a portion of the leading surface includes a leading bevel at a leading bevel angle from the ABS, the leading bevel angle being less than ninety degrees.

12. The method of claim 8 wherein the plurality of sidewalls are substantially straight such that the at least one of the plurality of sidewalls forms only the sidewall angle with the down track direction.

* * * * *